(12) United States Patent
Sankar et al.

(10) Patent No.: US 7,692,612 B2
(45) Date of Patent: Apr. 6, 2010

(54) VIDEO ENHANCEMENT AND DISPLAY POWER MANAGEMENT

(75) Inventors: Ananth Sankar, Palo Alto, CA (US);
David Romacho Rosell, Barcelona (ES);
Anurag Bist, Newport Beach, CA (US);
Praveen Dua, Cupertino, CA (US);
Sriram Sundararajan, Plano, TX (US)

(73) Assignee: Moxair, Inc., Newport Beach, CA (US)

( * ) Notice: Subject to any disclaimer, the term of this patent is extended or adjusted under 35 U.S.C. 154(b) by 470 days.

(21) Appl. No.: 11/471,356

(22) Filed: Jun. 20, 2006

(65) Prior Publication Data

US 2007/0182757 A1    Aug. 9, 2007

(51) Int. Cl.
G09G 5/30    (2006.01)
(52) U.S. Cl. .......................................... 345/77; 382/254
(58) Field of Classification Search ................. 345/102, 345/617, 629, 690; 348/617
See application file for complete search history.

(56) References Cited

U.S. PATENT DOCUMENTS

| | | | | |
|---|---|---|---|---|
| 5,170,443 A | * | 12/1992 | Todd | 382/274 |
| 5,226,175 A | * | 7/1993 | Deutsch et al. | 345/419 |
| 5,854,851 A | * | 12/1998 | Bamberger et al. | 382/132 |
| 6,535,191 B1 | * | 3/2003 | Miyachi | 345/94 |
| 7,176,878 B2 | * | 2/2007 | Lew et al. | 345/102 |
| 7,348,991 B1 | * | 3/2008 | Keating et al. | 345/589 |
| 7,424,148 B2 | * | 9/2008 | Goh | 382/169 |
| 7,460,103 B2 | * | 12/2008 | Konno et al. | 345/102 |
| 2006/0119612 A1 | * | 6/2006 | Kerofsky et al. | 345/590 |
| 2006/0209005 A1 | * | 9/2006 | Pedram et al. | 345/102 |

OTHER PUBLICATIONS

Wei-Chung Cheng et al., "Power Minimization in a Backlit TFT-LCD Display . . . ", Proc. of the Design, Automation and Test in Europe Conf. and Exhibition, vol. 1, 2004.
Liang Cheng et al., "Quality Adapted Backlight Scaling (QABS) . . . ", Proc. of the 4th International Conference on Networking, Reunion Island, France, Apr. 17-21, 2005.
Ali Iranli et al., , "HEBS: Histogram Equalization for Backlight Scaling", Proceedings of the Design, Automation and Test in Europe Conference and Exhibition, 2005.

* cited by examiner

*Primary Examiner*—Peter-Anthony Pappas
(74) *Attorney, Agent, or Firm*—Peter A. Businger (57) ABSTRACT

In visual display devices such as LCD devices with backlight illumination, the backlight typically consumes most of device battery power. In the interest of displaying a given pixel pattern at a minimized backlight level, the pattern can be transformed while maintaining image quality, with a transform determined from pixel luminance statistics. Aside from, or in addition to such minimizing, a transform also can be used for image enhancement, for a displayed image better to meet a visual perception quality. In either case, the transform preferably is constrained for enforcing one or several display attributes.

30 Claims, 6 Drawing Sheets

To preserve probability mass,
$$w = \frac{U(i)w(i)}{U}$$
So slope of transform in bin i is
$$s(i) = \frac{U(i)}{U}$$

Slope computation

Figure 1: Multi-stage transform

Figure 2: Slope computation

Figure 3: Transform computation using piecewise slope computation

1. Divide pixel value range into $B$ uniform bins. The set $P_i$ of pixel values in bin $b_i$ is defined as:
   $$P_i = \{p : (i-1) * w(i) \leq p < i * w(i) - 1\}, \text{ and } w(i) = w = 256/B$$

2. For each bin $b_i$, compute
   $$U(i) = \frac{\sum_{p \in P_i} h(p)}{w(i)}, \text{ where } h(p) \text{ is the number of pixels with luminance } = p$$

3. For each bin $b_i$, compute slope as
   $$s(i) = \frac{U(i)}{U}, \text{ where } U = \frac{\sum_{i=1}^{B} U(i) w(i)}{256}$$
   If $s(i) > s_{max}$ then $s(i) = s_{max}$
   If $s(i) < s_{min}$ then $s(i) = s_{min}$ 4. Starting at $(0,0)$, use the slopes $s(i)$ to create the piecewise linear transform, $t(p)$ Figure 4: Algorithm MULTISTAGE

Scaling: Let the required final value of the transform be $y_f$

1. If $y_f > t(255)$, then a. $h = y_f - t(255)$ b. $scale = \dfrac{h + \sum_{i \in X} s(i)w(i)}{\sum_{i \in X} s(i)w(i)}$, where X is the set of bins whose slopes are less than $s_{max}$ c. for $i \in X$ $s(i) = scale * s(i)$ if $s(i) > s_{max}$ then $s(i) = s_{max}$ end d. if any $s(i) > s_{max}$ in *step c*, go to *step b*

2. If $y_f < t(255)$, then a. $h = t(255) - y_f$ b. $scale = \dfrac{\sum_{i \in Y} s(i)w(i) - h}{\sum_{i \in Y} s(i)w(i)}$, where Y is the set of bins whose slopes are greater than $s_{min}$ c. for $i \in Y$ $s(i) = scale * s(i)$ if $s(i) < s_{min}$ then $s(i) = s_{min}$ end d. if any $s(i) < s$ in *step c*, go to *step b*

Figure 5: Algorithm SCALING

Figure 6: Inputs and Outputs for Display Power Management and Video Quality Enhancement

VIDEO ENHANCEMENT AND DISPLAY POWER MANAGEMENT

Related to the present patent application is patent application Ser. No. 11/496,191 of Jul. 31, 2006.

TECHNICAL FIELD

The invention concerns power management and image enhancement in visual display devices and, more particularly, in liquid-crystal display devices.

BACKGROUND OF THE INVENTION

Visual display devices are ubiquitous in battery-powered portable electronic devices such as notebook computers and mobile, hand-held telephones where, typically, they are the largest consumers of battery power. For example, in mobile devices equipped with thin-film transistor (TFT) liquid-crystal displays (LCD) utilizing backlight illumination, the LCD panel consumes more than 30% of the device power and the backlight typically consumes 75% of the LCD power. Thus, for conserving battery power, there is primary interest in minimizing the power consumption of the display device.

An LCD screen typically includes an array of liquid-crystal pixels arranged as a plurality of rows each having a plurality of pixels, arranged in columns, with each pixel capable of displaying any one of 256 luminance values of a gray scale and the corresponding chrominance values. Each pixel has its own liquid crystal cell, a dedicated thin-film transistor, and a dedicated capacitor. The electrical field of the capacitor controls the orientation of the liquid crystals within the cell, determining the optical transmissivity of the cell and thus its luminance when lit by a backlight. The capacitor is charged and discharged via its transistor. Device activation typically is row-by-row, so that, at any one time, all column lines are connected to a single row.

For saving power in an LCD device, dynamic backlight control can be used, involving dynamic scaling down and up of the backlight brightness while the device is being used, e.g. in playing back a movie. Moreover, it is beneficial to correspondingly transform an image/pattern to be displayed by transforming the pixel luminance values.

SUMMARY OF THE INVENTION

When the display backlight is set at a specific brightness value, a preferred transformation, (1), of the pixel values can be determined for minimizing perceived image distortion between the original untransformed image at maximum backlight and the transformed image under the specific backlight condition. Furthermore, a preferred transformation, (2), of the pixel values can be determined for minimizing power consumption while meeting an image-quality requirement. A preferred transformation can maximize the luminance of a given pattern and provide optimal contrast by assigning each pixel a value from a given dynamic range of pixel values based on the value of the probability density of the pixel luminance values for the given pattern. Preferably, in effecting a transformation, certain display attributes are taken into account for imposing constraints on transform parameters.

DETAILED DESCRIPTION

Transform Shape

Figure 1:
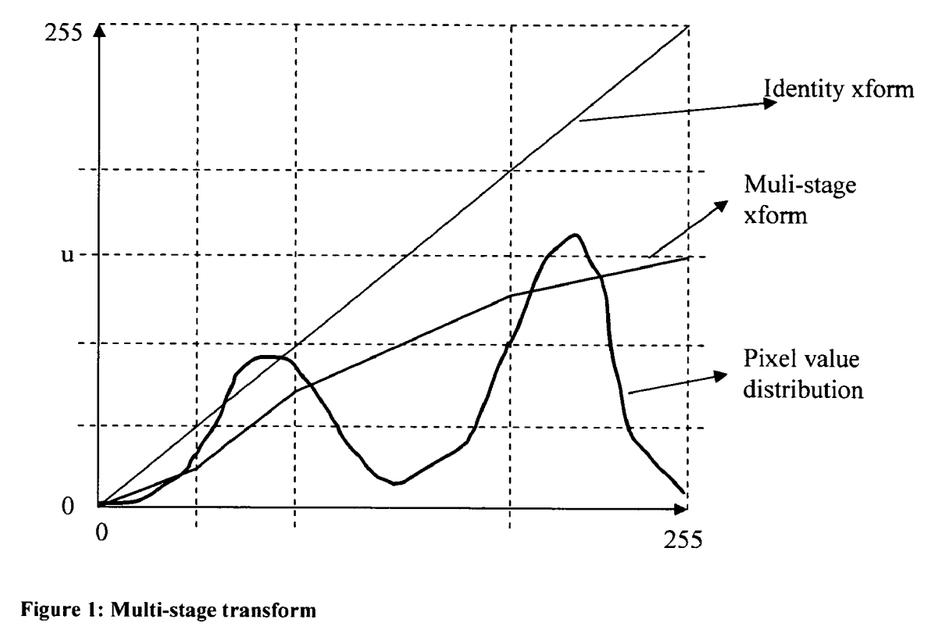
FIG. 1 is a graph showing an exemplary pixel value distribution along a line of 256 pixel values as may arise for a particular given pattern, and further showing the graphs of the identity transform and of an illustrative multi-stage transform.

For a transformation technique, FIG. 1 shows given or input pixel luminance values on the x-axis, output pixel values on the y-axis, and a pictorial representation of a distribution of the pixel values. The straight line from (0, 0) to (255, 255) represents the identity transform which saves no power and causes no distortion. For backlight control, a transform is desired so that, after scaling the backlight, the maximum perceived luminance value is u<255 at x=255. Then, assuming that the perceived luminance of the pixel is the product of the backlight value and the transformed pixel value, we can scale the backlight by a factor of u/255, saving power.

FIG. 1 also shows a generic multi-stage transform with 4 stages as an example. More generally, on judicious choice of the number of stages/segments and their slope, any desired transformation can be effected. Our invention includes techniques for advantageously determining the number of stages and their slopes.

Constraints On Transform Shape

A preferred transform will meet certain constraints for preventing undesirable effects. For example, if at any stage the slope of the transform were 0, then all the pixel values in that range would get compressed to a single value, resulting in total loss of contrast there. This is the case for certain transforms previously known in the art which clip the high pixel values to a threshold value, resulting in washout of bright pixels in the image. For example, washout will impair images of bulbs and lights due to loss of contrast in the region of the light. Conversely, if a slope is too large, pixel values that are close to each other are dramatically separated in the pixel-value space, causing a distorted rendition as compared with the original image. For example, where a given pixel value distribution has a peak, a swath of pixels have very similar luminance, e.g. in the court of a basketball scene. If the transform then has a high slope for these pixel values, the transformed court will have dramatically varying luminance, and the image will appear distorted.

In addressing such concerns, a preferred technique imposes two constraints on the slope, m, of the transform in any stage:

$m \leq s_{max}$, $m \geq s_{min}$,  (1)

where $s_{max}$ and $s_{min}$ are determined from a target backlight scaling factor, u/255. Then $$s_{max} = 255/u$$

$$s_{min} = s \times 255/u$$

where s is a suitably chosen parameter.

With these constraints, our preferred multistage transform can give good power savings through dynamic backlight control, maintaining brightness, maintaining contrast where necessary, avoiding contrast distortion in important regions, and minimizing washout effect as compared with known transforms.

Estimation of Multistage Transform

For the present description of a preferred technique for estimating a desired multi-stage transform we assume that u is given, i.e. that we know the required backlight scaling factor, and hence the power savings. The technique aims at finding a transform that minimizes distortion while achieving power savings determined by u. A basic exemplary procedure can be described as follows:

(a) In regions where the histogram value is high, i.e., where there are several pixels with that range of values, we maintain the original contrast by using as large a slope value as possible.

(b) In regions where the histogram value is low, i.e., where there are few pixels with values in that range, we use a lesser slope. Contrast is reduced in these regions, but because it affects only a few pixels the reduction is not perceived as much.

Figure 2:
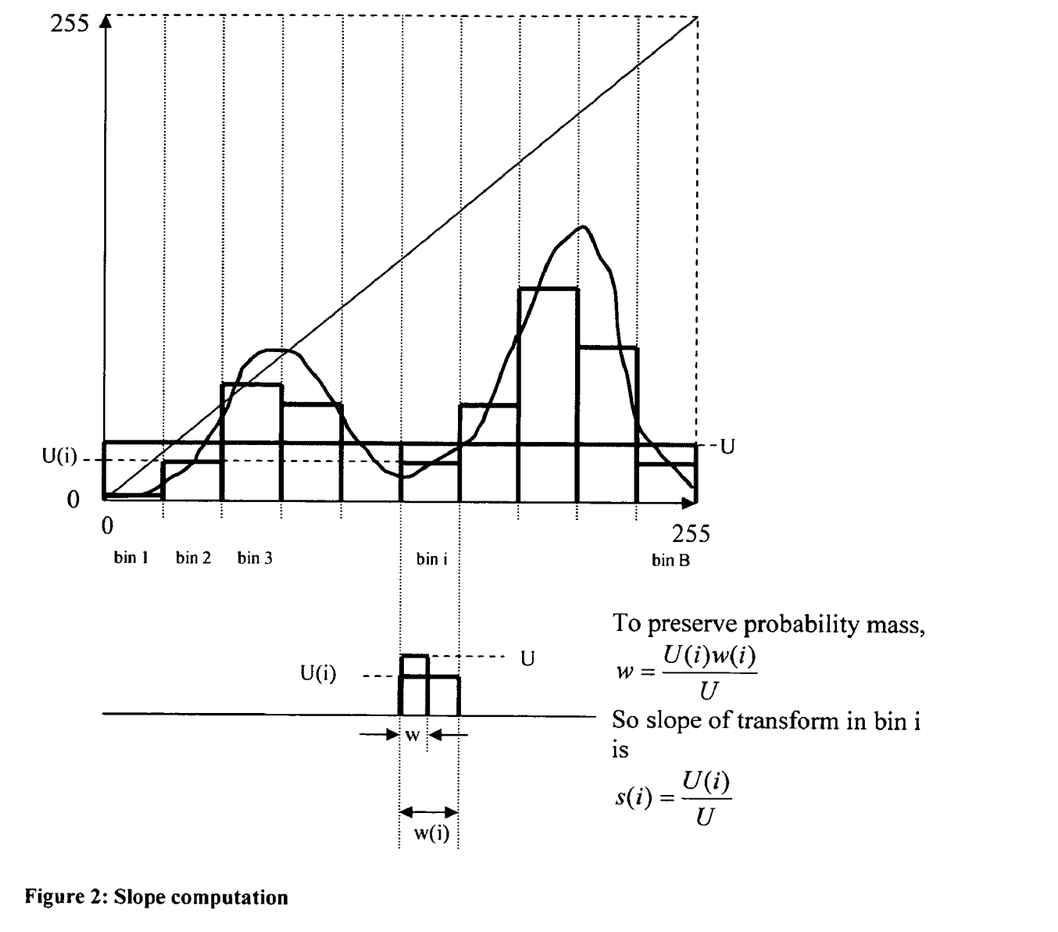
FIG. 2 is a graph showing the pixel value distribution of FIG. 1 approximated by a step function, and further showing how the transform slopes are computed.

We start by dividing the x-axis into B bins, where B can be between 0 and 255. A typical value of B may be between 5 and 30. Then we integrate the original histogram within these bins to get a piecewise uniform density function as shown in FIG. 2. U(i) denotes the value of the uniform density in bin i.

FIG. 2 also shows the uniform density over the entire dynamic range for comparison. The value of this density is denoted as U. If U(i)>U, then the number of pixels in bin i is greater than average, suggesting that we should maintain the original contrast by using an appropriate slope. If U(i)<U, then a less-than-average number of pixels is indicated in bin i, and so we can afford to lose some contrast by using a lesser slope. For example, as shown in FIG. 2, a practicable slope can be chosen as the one that transforms the uniform density with the value U(i) in bin i to another uniform density with the value U. This slope is given by $$s(i) = \frac{U(i)}{U} \quad (2)$$

On taking account of the constraints given by Equation 1, we obtain the following for determining the slope for bin i:

If $s(i) > s_{max}$, then $s(i) = s_{max}$

If $s(i) < s_{min}$, then $s(i) = s_{min}$

Figure 3:
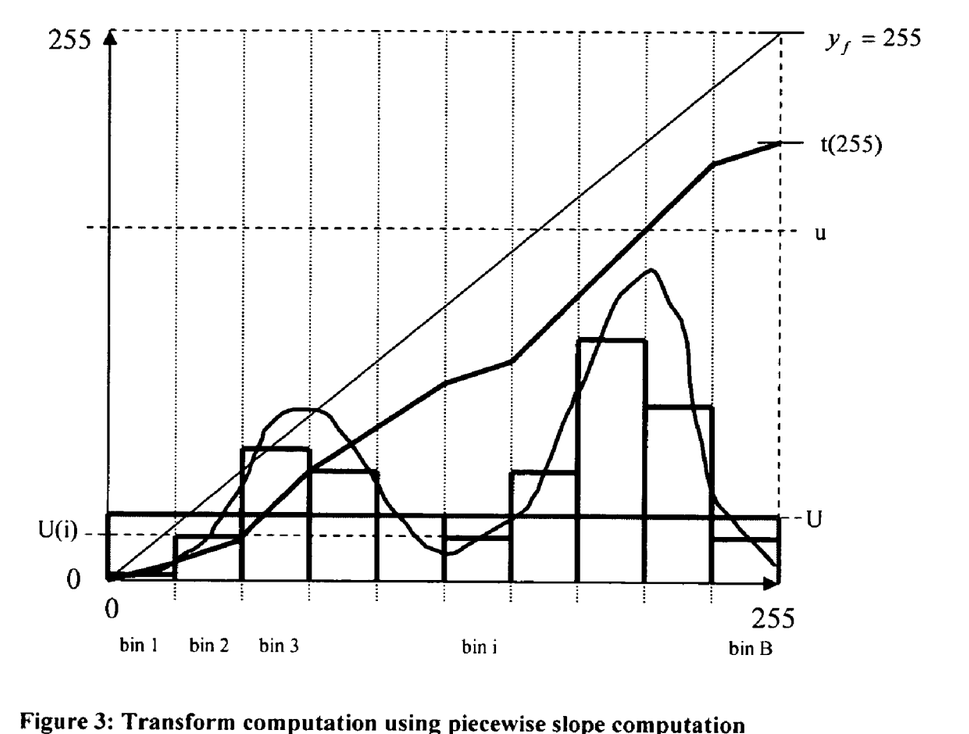
FIG. 3 is a graph showing a multi-stage transform obtained for the step function of FIG. 2.

FIG. 3 shows what the transform can look like after this step. At this point, the transform does not necessarily meet the desired maximum perceived luminance value, u. Using the target backlight scaling factor, u/255, the maximum desired transformed luminance can be computed as $$y_f = \min(255, x_f \times 255/u)$$

where $x_f$ is the maximum input luminance for the frame.

Typically, $x_f > u$, thus typically $y_f = 255$. FIG. 3 shows this case; $y_f = 255$ is the maximum transformed luminance, allowing a scaling of the backlight by a factor of u/255 to result in a maximum displayed brightness of u. FIG. 3 also shows u, the value the maximum perceived luminance. We are now interested in modifying the computed transform so that it has a maximum value=$y_f$. In FIG. 3, $y_f$ is more than the maximum value given by the current transform, t(255), so that we can scale up the transform by an appropriate factor. If $y_f$ were less than t(255), then we would scale down the transform. In either case we honor the constraints given by Equation 1.

Figure 4:
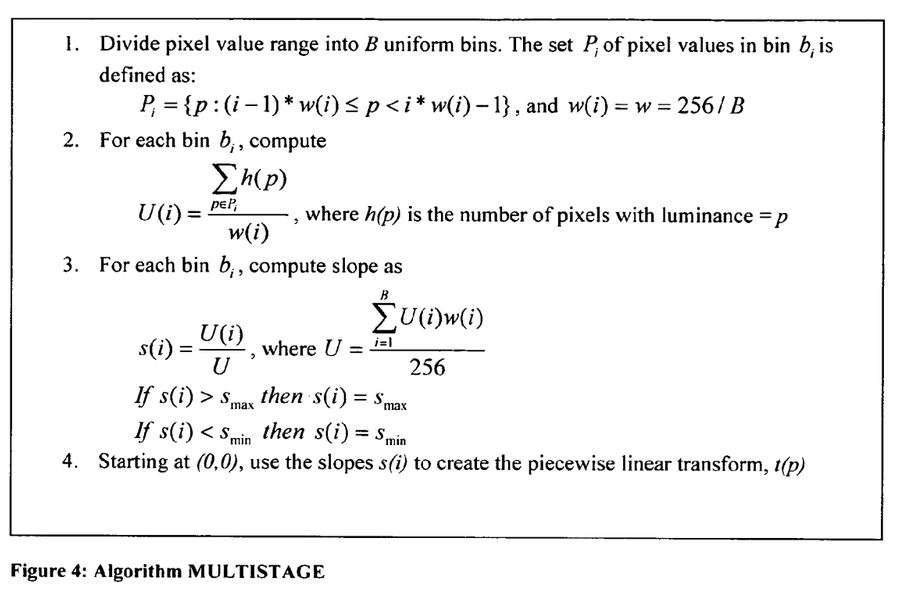
FIG. 4 is a representation of an exemplary procedure for transforming the given pixel values using the pixel value distribution of the given pattern in accordance with a preferred embodiment of the invention.

FIG. 4 shows an exemplary algorithm, designated as MULTISTAGE, for determining the transform t(p), $0 \leq p < 256$. It can be used for task (1) as described in the Summary above.

Figure 5:
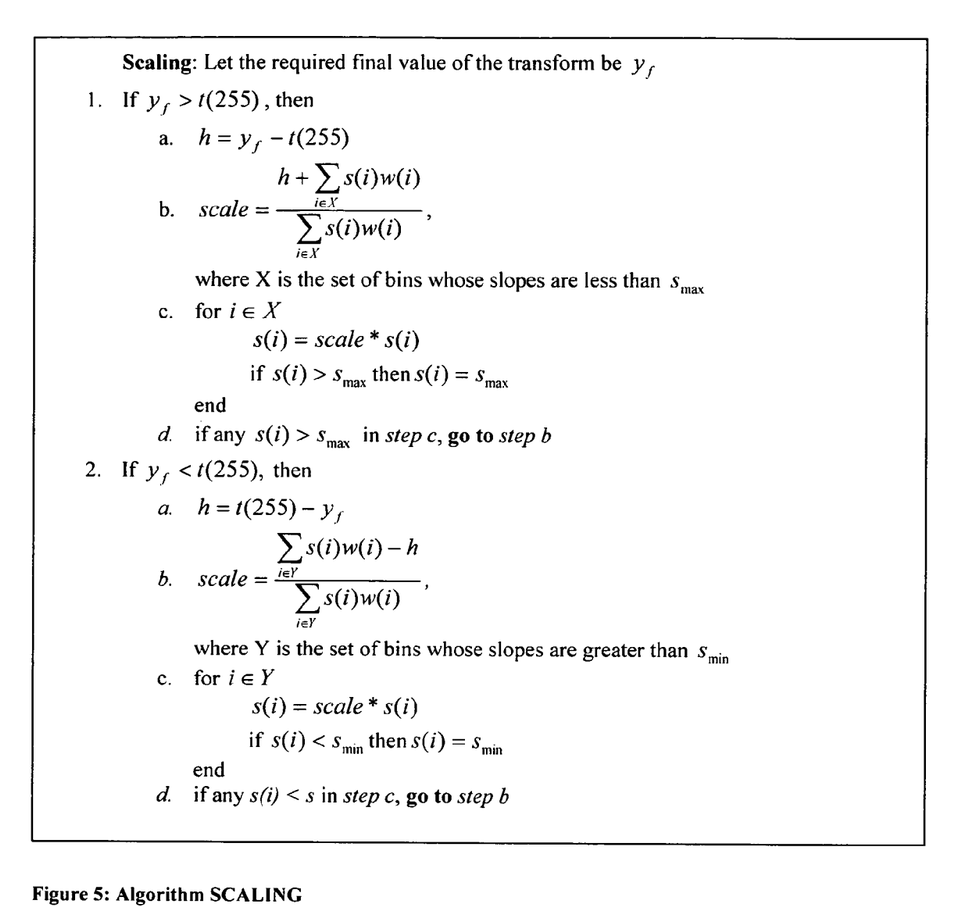
FIG. 5 is a representation of a further exemplary procedure for transforming the given pixel values using the pixel value distribution of the given pattern, representing a further preferred embodiment of the invention.

For task (2) we further seek to meet a prescribed maximum perceived brightness after backlight scaling. FIG. 5 shows an exemplary algorithm, there designated as SCALING, which can be used for task (2). On combining procedures MULTISTAGE and SCALING, both tasks can be performed simultaneously. We note a number of typical applications of the two algorithms individually and in combination as follows:

1. Apply MULTISTAGE alone. Use the maximum value, t(255), to determine the backlight scaling factor, t(255)/255. This seeks to give the best possible image without trying to meet any particular power saving goal.

2. Apply MULTISTAGE. Determine the backlight scale factor based on the desired backlight setting, u. The scale factor is given by u/255. Then apply SCALING. This yields an optimal video or image and also meets the desired power saving goal.

3. Apply a transform with a fixed slope from 0 up to a certain threshold pixel value. Use MULTISTAGE after this threshold value. This seeks to maintain maximum brightness, while still achieving contrast at the high pixel values.

4. Proceed per Application 3 above, and then apply SCALING as in Application 2.

5. Proceed per Application 4 above, but, when applying SCALING, scale the fixed-slope transform only if the minimum slope constraints cannot be met.

6. When used for video, apply a low-pass filter in time to smooth the transform determined for each frame of a scene by any of Applications 1-5 above. This minimizes flicker as may result from very fast transform changes frame to frame.

7. Apply a high-pass filter to sharpen the edges of the video processed by any of applications 1 to 6 described above.

8. By scaling of chrominance pixels, apply a color boost to the chrominance values for improving the color combination of the processed image. For example, in a preferred embodiment in the YUV space, the U and V components each are scaled up by a respective fixed factor. Alternatively, chrominance scaling can involve a generic functional transform of the luminance component.

Interaction With Environment

Figure 6:
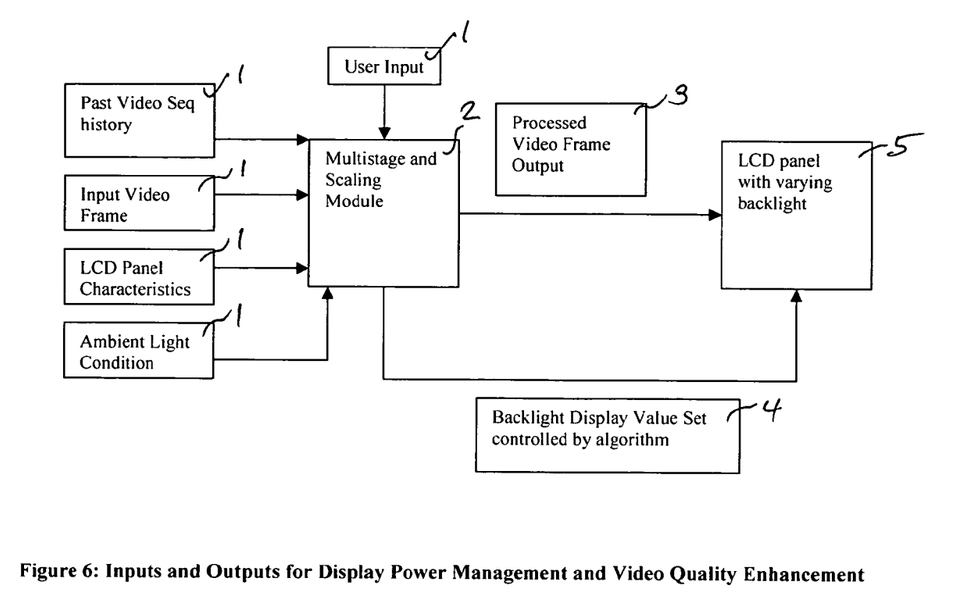
FIG. 6 is a block schematic of an exemplary embodiment of the technique.

For an over-all view of a typical implementation of our technique, FIG. 6 shows different types of input 1 to a processor 2 for generating processed video frame output 3 as well as a backlight value 4 for display of video frame output 3 on an end client display device 5. As illustrated, for example, input 1 can include any/all of: values and statistics of pixels of an input video frame, values and statistics of a past video frame in a sequence of video frames, LCD panel characteristics of the display device 5, ambient light conditions of the environment in which the input video frame was generated, and user input. Input data are used by processor 2 in determining transform parameters, determining a backlight value, and transforming pixel values. At the display device 5, the transformed pixel values can be displayed against a backlight as determined by processor 2, or against some other supplied background. For display, a video/image may be targeted for either or a combination of (i) least power consumption on the display device 5 and (ii) best possible enhancement as compared with the input.

Techniques of the invention can be applied for static backlight setting of an individual display, or dynamically in a scenario where the backlight can be changed from frame to frame of a video sequence. In either case, in processing a frame, the processor 2 can make reference to at least one previously processed frame. A previous frame can also be used for smoothing, e.g. with a suitable small portion $\alpha$ of the pixel values of a previous frame added to a portion $(1-\alpha)$ of the current frame of a scene.

Technological Benefits And Uses

Techniques of the invention can generate high-quality video, still images, graphics, and screen shots of other multimedia applications such as Microsoft Power Point and Word applications, all at minimized display backlight power or at any specific display backlight power. Furthermore, the techniques can be useful for enhancing a display even where there may be little or no concern with backlight power. Our techniques can be implemented for power management and/or image enhancement in notebook-PC's, media players such as DVD playback devices, handheld consumer electronic devices, portable media players, personal digital assistant (PDA) devices, LCD TV's and mobile phones, for example.

The invention claimed is:

1. A computer method for generating a pixel display pattern from a pixel given pattern using a nonlinear continuous transform from given pixel values to generated pixel values, the method comprising:
   (a) for at least one display attribute, determining for each one of the given pixel values, via a processor, constraints which include an upper bound and a lower bound on the slope of the transform at each respective one of the given pixel values, wherein each lower bound is greater than 0, and wherein the constraints for at least one of the given pixel values differ from the constraints for at least one other of the given pixel values; and
   (b) for a background having a background luminance value and subject to the said constraints, determining the transform via the processor such that, if the pixel display pattern is displayed against the background, visual distortion as compared with the pixel given pattern is minimized.

2. The method of claim 1, wherein the at least one display attribute is minimization of washout in the pixel display pattern.

3. The method of claim 1, wherein the at least one display attribute is maintenance of image contrast in the pixel display pattern.

4. The method of claim 1, wherein the transform is determined from statistics of the given pixel values.

5. The method of claim 4, wherein the statistics comprises histogram information.

6. The method of claim 1, wherein the background luminance value is prescribed.

7. The method of claim 1, wherein the background luminance value is determined by information obtained from the given pixel values.

8. The method of claim 7, wherein the information is obtained from a histogram of the given pixel values.

9. The method of claim 1, further comprising determining a reduced background luminance value.

10. The method of claim 9, wherein determining the reduced background luminance value comprises using statistics of the given pixel values.

11. The method of claim 9, wherein the pixel given pattern is a present pixel given pattern of a video sequence which includes a previously processed pixel given pattern for which a previous background luminance value has been determined, and wherein the background luminance value determined in step 1(b) for the present pixel given pattern differs from the previous background luminance value.

12. The method of claim 1, wherein step 1(b) is performed for a plurality of different backgrounds.

13. The method of claim 1, wherein the transform comprises a piecewise linear function.

14. The method of claim 13, wherein each of the linear pieces of the piecewise linear function spans at least one bin of a histogram of the given pixel values.

15. The method of claim 14, wherein at least one of the linear pieces of the piecewise linear function has a slope which is determined from:
    local statistics of the given pixel values in a histogram bin spanned by the at least one of the linear pieces, and
    global statistics over all histogram bins.

16. The method of claim 13, wherein the constraints are the same at each of the given pixel values which pertain to a linear piece of the piecewise linear function.

17. The method of claim 16, wherein, at contiguous low given pixel values, the upper bound and the lower bound are the same.

18. The method of claim 16, wherein, at contiguous high given pixel values, the upper bound and the lower bound are the same.

19. The method of claim 1, further comprising spatial high-pass filtering of the pixel display pattern.

20. The method of claim 1, wherein the pixel given pattern is one of a video sequence.

21. The method of claim 20, further comprising temporal low-pass filtering of sequential transformed display patterns.

22. The method of claim 1, wherein the pixel given pattern has chrominance, and the method further comprises determining a factor for scaling the chrominance.

23. The method of claim 1, further comprising accepting input of: the given pixel values, and at least one of: (i) video sequence history, (ii) LCD panel characteristics and (iii) ambient light condition.

24. The method of claim 1, further comprising transmitting the pixel display pattern for display on a display device.

25. The method of claim 24, further comprising transmitting the background luminance value for which the transform was determined to the display device.

26. The method of claim 25, further comprising displaying the pixel display pattern against the background having the background luminance value for which the transform was determined.

27. The method of claim 24, further comprising displaying the pixel display pattern against a background other than the background having the background luminance value for which the transform was determined.

28. The method of claim 24, wherein the display device is included in one of: a notebook-PC, a DVD playback device, a handheld consumer electronic device, a portable media player, a PDA device, an LCD TV and a mobile phone.

29. A device for generating a pixel display pattern from a pixel given pattern using a nonlinear continuous transform from given pixel values to generated pixel values, the device comprising:

(a) a first device portion which, for at least one display attribute, is made for determining for each one of the given pixel values, via the first device portion, constraints which include an upper bound and a lower bound on the slope of the transform at each respective one of the given pixel values, wherein each lower bound is greater than 0, and wherein the constraints for at least one of the given pixel values differ from the constraints for at least one other of the given pixel values; and (b) a second device portion which, for a background having a background luminance value and subject to the said constraints, is made for determining the transform via the second device portion such that, if the pixel display pattern is displayed against the background, visual distortion as compared with the pixel given pattern is minimized.

30. A processor for generating a pixel display pattern from a pixel given pattern using a nonlinear continuous transform from given pixel values to generated pixel values, the processor comprising:

(a) a first processor module which, for at least one display attribute, is instructed for determining for each one of the given pixel values, via the first processor module, constraints which include an upper bound and a lower bound on the slope of the transform at each respective one of the given pixel values, wherein each lower bound is greater than 0, and wherein the constraints for at least one of the given pixel values differ from the constraints for at least one other of the given pixel values; and (b) a second processor module which, for a background having a background luminance value and subject to the said constraints, is instructed for determining the transform via the second processor module such that, if the pixel display pattern is displayed against the background, visual distortion as compared with the pixel given pattern is minimized.

* * * * *